T. L. BURTON.
HANGER DEVICE FOR BRAKE SHOES.
APPLICATION FILED JUNE 12, 1918.
1,296,917.
Patented Mar. 11, 1919.
-FIG. 1.-
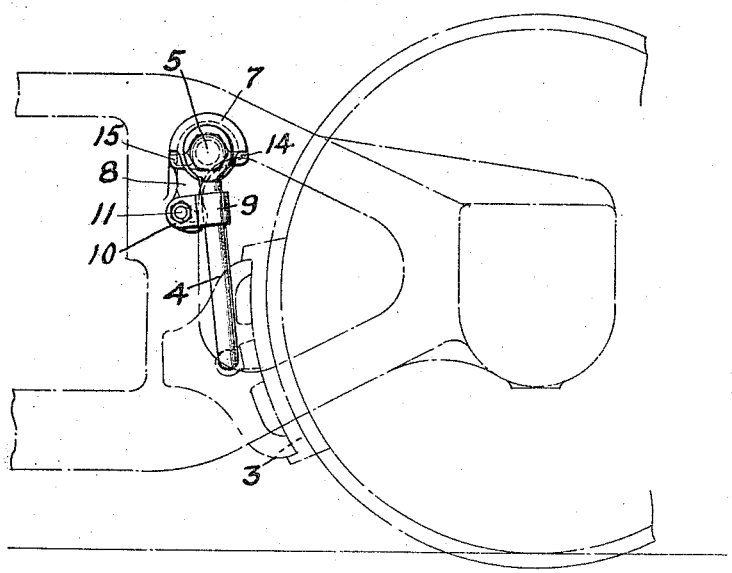
-FIG. 2.-
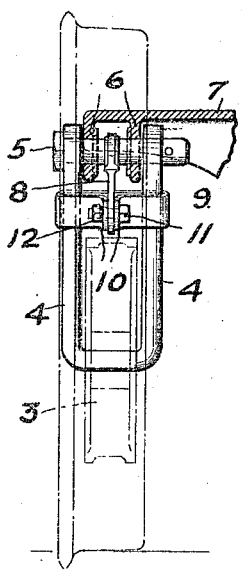
-FIG. 3.-
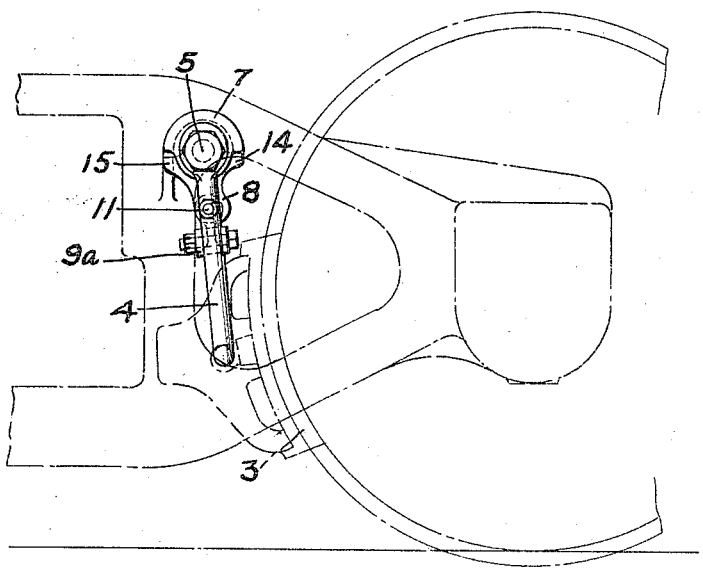
-FIG. 4.-
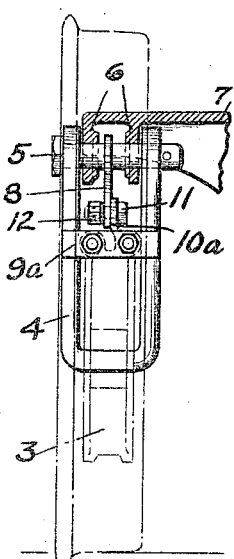
INVENTOR
Thomas L. Burton.
by Edward A. Wright
Att'y

UNITED STATES PATENT OFFICE.

THOMAS L. BURTON, OF ST. LOUIS, MISSOURI, ASSIGNOR TO THE AMERICAN BRAKE COMPANY, OF ST. LOUIS, MISSOURI, A CORPORATION OF MISSOURI.

HANGER DEVICE FOR BRAKE-SHOES.

1,296,917.      Specification of Letters Patent.      Patented Mar. 11, 1919.

Application filed June 12, 1918. Serial No. 239,511.

*To all whom it may concern:*

Be it known that I, THOMAS L. BURTON, a citizen of the United States, residing at St. Louis, in the State of Missouri, have invented a certain new and useful Improvement in Hanger Devices for Brake-Shoes, of which improvement the following is a specification.

This invention relates to brake mechanism and has for its object to provide an improved hanger device for controlling the brake shoe clearance and maintain the same substantially uniform and constant under the varying conditions of wear of shoes and wheels. My present improvement relates more particularly to brake hangers of the U-shaped type having two side members and comprises certain features of construction which will be hereinafter more fully described and claimed.

In the accompanying drawing Figure 1 is side elevation of one form of brake hanger device embodying my improvement; Fig. 2 an end view of the same, and Figs. 3 and 4, similar side and end views, respectively, showing a modification.

According to the construction shown in Figs. 1 and 2, the hanger 4, is of the U-shaped type having the lower bar supporting the brake shoe 3, and the two side bars pivotally mounted at their upper ends on the pin 5, extending through the two spaced lugs 6, of the suspension bracket 7, of the truck frame.

Pivotally mounted on the frame and preferably on the pin 5, between the lugs 6, is the friction arm 8, having an elongated opening at its lower end. A clamp member 9, is secured to the two side bars of the hanger and is formed with a lug or lugs 10, these lugs being clamped to the friction arm 8, by means of bolt 11, extending through the elongated opening at the lower end of arm 8, and carrying a friction washer and nut 12. This nut 12 is adjusted to give the required frictional resistance to relative movement between the friction arm and the clamp secured to the hanger bars. The friction arm 8, is provided with stop lugs 14, and 15, for engaging the lower edges of the suspension bracket 7, to limit the movement thereof in the application and release of the brake and define the brake shoe clearance.

Any suitable or preferred form of brake rigging may be employed for operating the brake shoes.

When an application of the brakes is made and the brake shoe is swung against the wheel the friction arm 8, also swings with the hanger until the stop 14 strikes the bracket 7. This limits the movement of the arm in this direction and if a further movement of the brake hanger and shoe is necessary to bring the shoe against the wheel with the desired pressure, the force of the application will overcome the frictional resistance between the arm 8 and clamp 9, and there will be a relative movement or shifting of this connection. Then when the brakes are released the hanger and friction arm swing back together until the stop 15, engages the bracket 7, thus limiting the release movement to the desired amount of clearance for the brake shoes, the frictional resistance between the arm 8 and clamp 9 being sufficient to hold the hanger and shoe in this position when released.

As the brake shoe and wheel wear down it will be seen that a further movement of the hanger will be made at each application, which excess movement will shift the frictional connection to compensate for the wear and maintain a uniform and constant release movement and brake shoe clearance regardless of the wear of brake shoes and wheels.

In the modification shown in Figs. 3 and 4, the construction is substantially the same as above described, except that a different form of clamp $9^a$, is employed, composed of two bars bolted together and having a lug $10^a$ extending up between the side bars of the hanger. The clamping bolt 11 extends through said lug and the slotted opening in the lower end of the friction arm 8. The operation is substantially the same as that before described with reference to Figs. 1 and 2, and will be readily understood.

When the brake shoe is worn down to such a point that it is desired to replace it with a new shoe the repair-man usually places his bar between the shoe and wheel to force the brake head away from the wheel. This movement may shift the friction connection but it will be seen that the first application of the brakes after the new shoe has been inserted will automatically adjust the frictional connection to the desired position for insuring the uniform and constant brake shoe clearance when the brakes are released.

What I claim is:

1. In a brake device, the combination of a brake shoe, a hanger formed with two side bars pivoted to the truck frame, a friction arm, stops for limiting the movement of said arm, and a clamp secured to said side bars of the hanger and having a frictional connection with said arm.

2. In a brake device, the combination of a brake shoe, a hanger formed with two side bars pivoted to the truck frame, a friction arm mounted on the same pivot between said side bars, stops for limiting the movement of said arm, and a clamp secured to the side bars and having a frictional connection with said arm.

3. In a brake device, the combination of a brake shoe, a hanger formed with two side bars pivoted to the truck frame, a friction arm pivotally mounted between said side bars, stops for limiting the movement of said arm, a clamp secured to the side bars, and a clamping bolt and nut forming an adjustable frictional connection between the clamp and said arm.

4. In a brake device, the combination of a brake shoe, a U-shaped hanger, a suspension bracket having lugs, a pivot pin extending through the side bars of said hanger and said lugs, a friction arm pivotally mounted on said pin, stops for limiting the movement of said arm, and a clamp secured to the hanger and having a frictional connection with said arm.

5. In a brake device, the combination of a brake shoe, a hanger therefor, a suspension bracket having stop edges, the hanger being pivoted to the bracket, a friction arm also pivoted to said bracket and having stops for engaging said stop edges thereof, and a clamp secured to the hanger and having a frictional connection with said arm.

In testimony whereof I have hereunto set my hand.

THOMAS L. BURTON.

Copies of this patent may be obtained for five cents each, by addressing the "Commissioner of Patents, Washington, D. C."